United States Patent [19]

Cosman et al.

[11] Patent Number: 5,530,357

[45] Date of Patent: Jun. 25, 1996

[54] SONDE WITH REPLACEABLE ELECTRONICS AND A ROTATABLE, TUBULAR INNER SHELL WHEREIN A BATTERY IS LOCATED

[75] Inventors: Armond D. Cosman; Larry R. Cox, both of Austin, Tex.

[73] Assignee: Minnesota Mining and Manufacturing Company, St. Paul, Minn.

[21] Appl. No.: 267,965

[22] Filed: Jun. 29, 1994

[51] Int. Cl.[6] .............................. G01V 3/08; G01R 19/02
[52] U.S. Cl. .................................... 324/326; 324/67
[58] Field of Search ......................... 324/326, 323–346, 324/351, 355, 366, 66, 67

[56] References Cited

U.S. PATENT DOCUMENTS

| 3,597,680 | 4/1971 | Haddon | 324/67 |
| 4,502,010 | 2/1985 | Kuckes | 324/338 |
| 4,577,153 | 3/1986 | Stolarczyk | 324/338 |
| 4,845,494 | 7/1989 | Hanson et al. | 340/857 |
| 4,884,071 | 11/1989 | Howard | 340/854 |
| 5,337,002 | 5/1994 | Mercer | 524/326 |

*Primary Examiner*—Sandra L. O'Shea
*Assistant Examiner*—Roger Phillips
*Attorney, Agent, or Firm*—Gary L. Griswold; Walter N. Kirn; Jack V. Musgrove

[57] ABSTRACT

A sonde for tracing an underground conduit has a separable casing which receives a removable inner shell, the transmitter electronics being located in the shell. The electronics may be permanently potted in the inner shell or removable therefrom. The interchangeability of the transmitter facilitates the use of different types of transmission signals without requiring the more expensive casing for each such transmitter. The shell also advantageously supports the battery, and further is free to rotate within the housing such that, as the cap is screwed onto the housing, the shell and battery are free to rotate, precluding damage to the battery leads which may be caused by twisting of the leads.

3 Claims, 2 Drawing Sheets

SONDE WITH REPLACEABLE ELECTRONICS AND A ROTATABLE, TUBULAR INNER SHELL WHEREIN A BATTERY IS LOCATED

BACKGROUND OF THE INVENTION

1. Field of the Invention

The present invention generally relates to devices for marking, locating and tracing obscured conduits, and more particularly to a probe or sonde which has a separable case and inner shell, facilitating repair and replacement of components including the battery and transmitter assembly.

2. Description of the Prior Art

Probes have been used for many years to trace obscured conduits, such as underground pipes for water, wastewater, gas, etc. For example, construction workers trace the path of the conduit in order to avoid it during excavation. It is also necessary to locate conduits from time to time for repair or other maintenance. These probes, also referred to as sondes, are provided at different frequencies to accommodate various types of receivers, typically operating at 512 Hz, 8 kHz and 33 kHz, either continuous or pulsed. The outer dimensions commonly range from a few millimeters in diameter and a few centimeters in length, to a few centimeters in diameter and half a meter in length.

As shown in the prior art illustration of FIG. 1, the sonde is placed in the conduit at an access point, and is forced through the conduit by a rod or shaft. The rod is flexible enough to store and dispense from a reel above ground, but it is sufficiently rigid to push the sonde through the conduit. A craftsperson using a receiver follows the sonde above ground, marking the surface to delineate the underground path of the pipe. The transmitter of the probe may be modified for various purposes as discussed in U.S. Pat. No. 3,597,680.

One problem with prior art sondes is the incorporation of the electronics (transmitter) as a permanent part of the outer protective case. The outer case is a costly component since it must service hostile environments such as water, sharp edges in broken pipe, and ground entrapped hydrocarbon solvents that attack low cost polymeric materials. For example, the '680 patent refers to the expensive material sold as DELRIN by E. I. duPont de Nemours and Co. A complete sonde can consequently cost several hundred dollars. Yet, since the transmitter is potted or affixed to the inside of the case, the sonde can become essentially worthless if the transmitter breaks down. Moreover, when there is a need to change the frequency of the transmission signal or its modulation method, the present systems all require total replacement of the device. The present units are also essentially non-repairable, although the battery may be salvageable.

It is possible, but very problematic, to provide power to a sonde via the push rod, so all commercially available sondes are battery powered. Many sondes require battery replacement after as little as six hours of use. Custom batteries as well as standard 1.5 volt or 9 volt batteries are used. A second problem with prior art sondes relates to the manner is which the battery is placed inside the case. When the cap of the sonde is removed from or attached to the housing, by screwing it off or on, the cap engages one end of the battery and causes the leads thereof to twist and become entangled, often damaging them to the point where they are non-repairable, i.e., the entire sonde is again worthless. It would, therefore, be desirable and advantageous to devise a sonde which allows multiple electronic modules to be used with the same outer casing, and which does not damage the battery leads during disassembly or re-assembly of the sonde casing.

SUMMARY OF THE INVENTION

The present invention provides a small, battery-powered transmitter or sonde, for use in tracing the path of an underground conduit, the sonde generally comprising an outer casing which is separable from the battery holder and electronics assembly. The casing includes a main housing and a cap. The battery holder is preferably a tubular, inner shell and also holds the electronics assembly. The shell is sized to be easily removable from the housing, allowing simple changing of the frequency or modulation method. In this manner, greater flexibility is provided in the use of the sondes without having to have multiple outer cases. The battery holder is free to rotate within the housing such that, as the cap is screwed into the housing, the battery and holder are free to rotate, thereby relieving any twisting forces on the battery leads.

BRIEF DESCRIPTION OF THE DRAWINGS

The invention will best be understood by reference to the accompanying drawings, wherein.

DESCRIPTION OF THE PREFERRED EMBODIMENT

Figure 2:
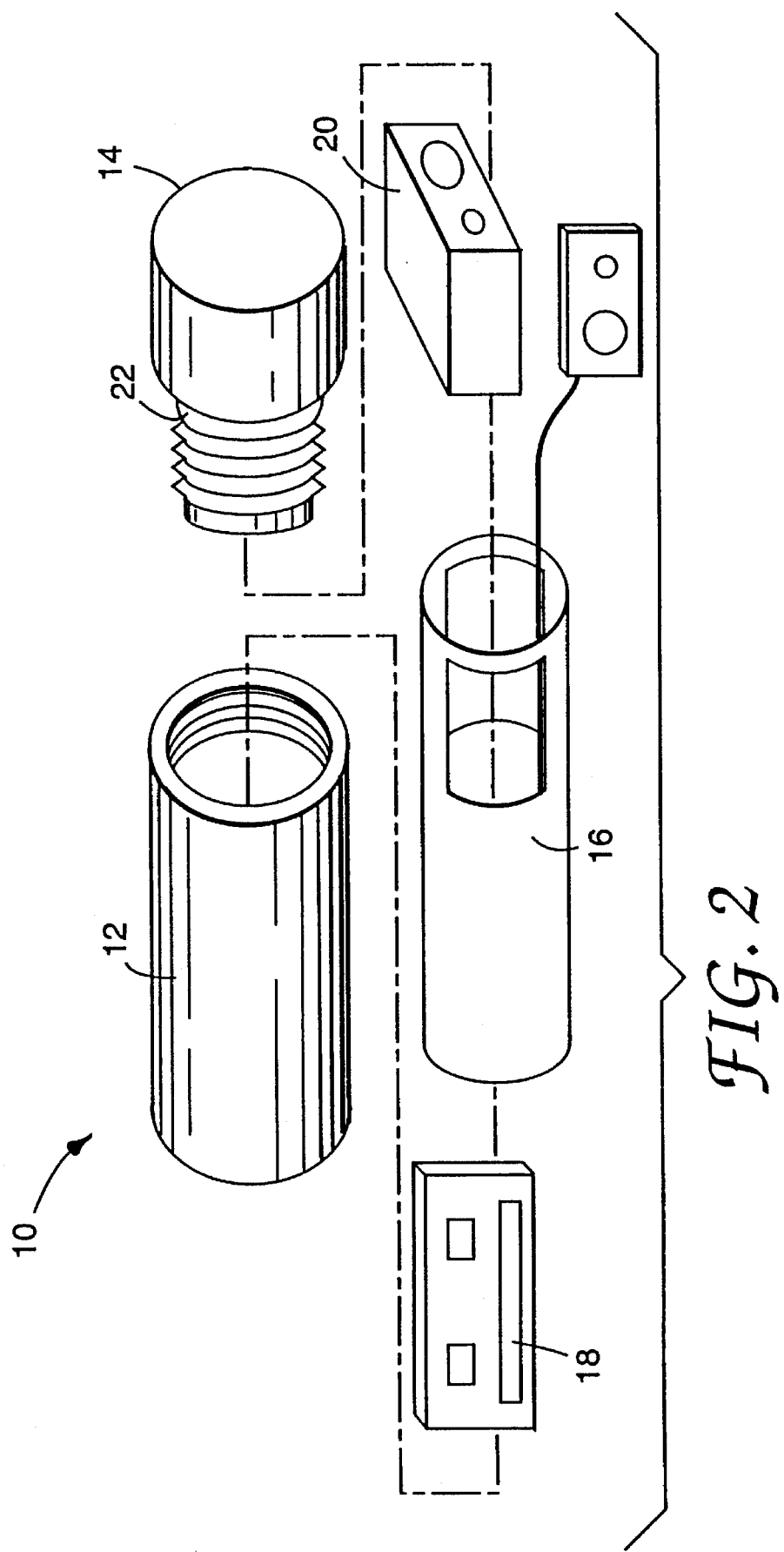
FIG. 2 is an exploded perspective view of one embodiment of the sonde of the present invention.

With reference now to the figures, and in particular with reference to FIG. 2, there is depicted one embodiment 10 of the probe or sonde of the present invention. Sonde 10 is generally comprised of a generally elongate outer casing, which includes a main body or housing 12 and a cap 14, and an electronics assembly which includes an inner shell 16, a transmitter circuit 18 located in one end of shell 16, and a battery 20 held in the other end of shell 16. While inner shell 16 is adapted to be manually removable from housing 12, circuit 18 may further be removably located in shell 16. Housing 12 and cap 14 are both preferably made of a durable, rigid polymer, such as that sold by E. I. duPont de Nemours and Co. under the trademark DELRIN, and they each have threaded portions allowing for easy opening of the casing by screwing the cap on and off. An O-ring 22 is used to seal the joint between housing 12 and cap 14, and provides a watertight construction; other sealing means may be employed, such as a gasket. It is understood that the relative lengths of housing 12 and cap 14 as illustrated in the figures are exemplary only, as these two elements could practically be equal in length.

Inner shell 16 is generally elongate and preferably tubular, and may conveniently be formed from a piece of polyvinylchloride (PVC) pipe. It is sized to be easily removed from housing 12, and may carry one of several different types of transmitter circuits. For example, a system may be constructed according to the present invention using a single sonde casing, and a plurality of transmitter circuits, each tuned to a different transmission frequency. Alternatively, the circuits may be designed to send signals having other different transmission characteristics, such as various modulation methods. Conventional circuits are used. The use of removable inner shell 16 also makes it easier to replace the batteries. Moreover, since shell 16 is free to rotate within housing 12, the entire electronics assembly, including the battery, is also free to rotate, so that screwing on or off the cap does not cause the battery leads to become entangled, thereby precluding the potential of twisting the leads off. This advantage is present for any design wherein the cap is rotated, i.e., not just a screw-on cap, but also, e.g., a twist-on cap (bayonet-style latching with lugs).

Figure 3:
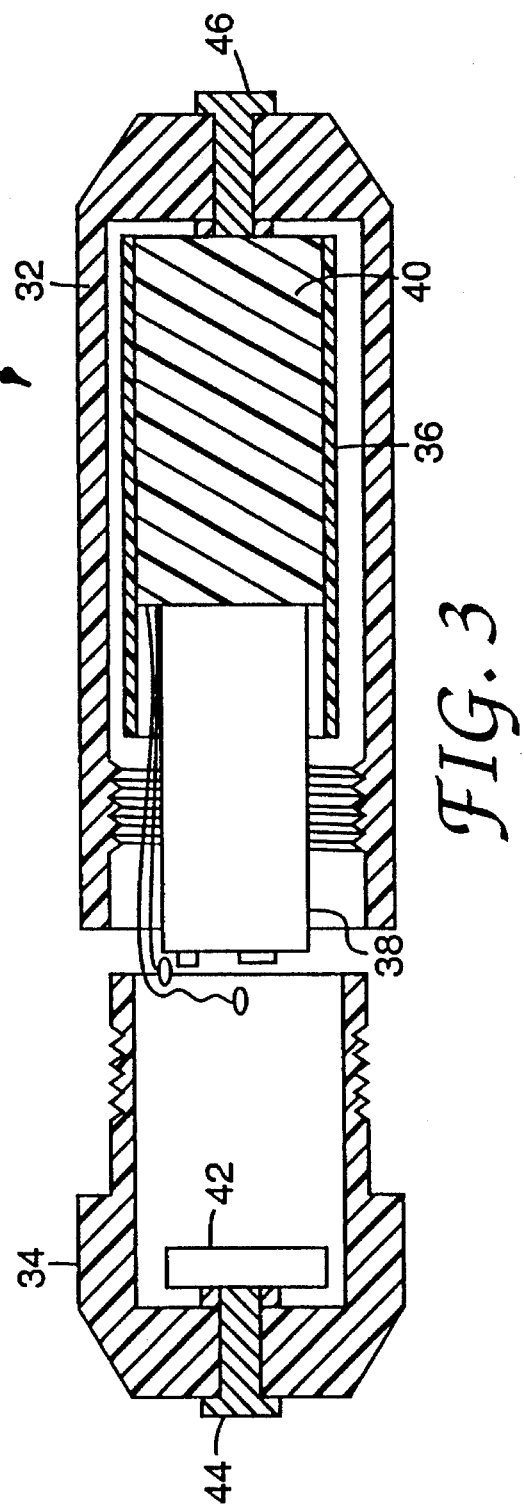
FIG. 3 is a sectional view of another embodiment of the present invention.

Referring now to FIG. 3, an alternative embodiment 30 has a similar housing 32 and cap 34, inside of which lies a similar removable inner shell 36. The edges of the cap and housing are tapered slightly to make the casing more streamlined. In this embodiment, shell 36 is not quite so long as shell 16, i.e., battery 38 is only partially located in shell 36, and the transmission circuit 40 is permanently potted in shell 36. A small, resilient pad 42 may be placed along the inner surface of cap 14 to provide frictional engagement of the pad with the end of battery 38, further assuring proper rotation of shell 16 during screwing of cap 14. An O-ring or gasket is again used to seal the device. Fittings 44 and 46, preferably constructed of brass, may be inserted in either end of the sonde to provide for attachment to the rod which pushes the sonde through the pipeline. While each of the fittings may be used for this purpose, it is generally desirable to limit attachment of the rod to the housing only, and not the cap; it is more likely that the longer housing portion of the sonde will become lodged in the conduit, as opposed to the cap, with the result that, if the push rod were attached to the cap, then rotation of the rod could actually twist the cap loose from the housing, disturbing the environmental seal. Accordingly, only fitting 46 is adapted to receive the rod, while fitting 44 may be used to attach other implements. For example, other means may be provided to transport the sonde down the pipe, such as pneumatically blowing the sonde down the pipe, and then retrieving it slowing by a cord which has been attached to fitting 44. In the preferred embodiment, fitting 44 has a ¼-20 threading, suitable to receive an adapter for such a cord, while fitting 46 has a ⅜-16 threading, designed to receive the end of the push rod.

The dimensions of sondes 10 and 30 may vary considerably depending upon the particular application, but the following approximate dimensions are considered exemplary. The sonde housing and cap have an outer diameter of 4 cm. The housing is 11.4 cm long and the cap is 4.4 cm long (including a 1.9 cm section which is inserted in the housing), resulting in an overall length of the casing of 13.9 cm. The inner diameter of the bores in the housing and cap is 3 cm. The O-ring is a #2-123. The foregoing descriptions provide a small, battery-powered probe which allows the simple and quick changing of electronic assemblies.

OPERATION

When the craftsperson is required to determine the path of an underground pipe, or other obscured conduit, she or he first considers the type of transmitter unit desired, e.g., the appropriate transmission frequency and modulation method. The corresponding electronics assembly is selected and placed in the housing, the battery attached, and the cap is securely screwed on to provide a waterproof seal. The battery leads are preferably snapped from above, i.e., the contacts extend outwardly from the housing. Since the inner assembly is free to rotate in the housing, and since the battery is now part of this inner assembly, leads from the electronics to the battery do not tend to be twisted by screwing on the cap.

Figure 1:
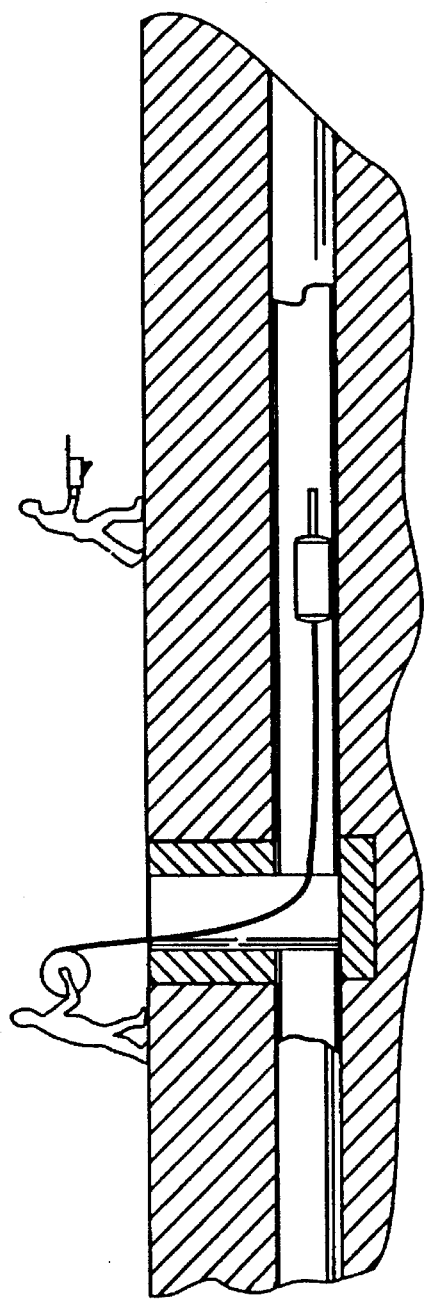
FIG. 1 is a simplified fragmentary view of a prior art system using a probe to trace an underground conduit.

After assembling the sonde, it is attached to a rod and placed in the conduit in a manner similar to that shown in FIG. 1. A conventional receiver is used to pick up the signal transmitted by the sonde as it moves through the pipe. Pin flags or other indicia may be used to mark the corresponding path on the surface. If at any time a particular transmission circuit becomes non-operational, it can be separately replaced without having to incur the greater expense of a new outer shell.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A system for determining the path of an underground pipe, comprising:
    at least one sonde casing, including
        a housing formed of a durable, rigid polymer, said housing having a closed end and an open end, and a threaded portion at said open end, and
        a cap formed of a durable, rigid polymer, said cap having a threaded portion adapted to engage said threaded portion of said housing;
    a plurality of transmitter units, each having
        a generally elongate, tubular inner shell sized to fit within said housing, be removable therefrom, and free to rotate therein,
        a battery at least partially located in said inner shell, and
        circuit means, permanently potted in said inner shell, for transmitting an electromagnetic signal;
    each of said transmitter units having different circuit means imparting, respectively, different transmission characteristics to said electromagnetic signal;
    a resilient pad located inside said cap, sized to engage said battery whereby, as said cap is screwed onto said housing, said battery and inner shell rotate therein;
    means for transporting said sonde casing down the pipe;
    reel means for storing and dispensing said rod means; and
    receiver means for detecting said electromagnetic signal.

2. The system of claim 1 wherein each said circuit means has different means for modulating said electromagnetic signal.

3. The system of claim 1 wherein each said circuit means is tuned to a different transmission frequency.

* * * * *